Figure 1:
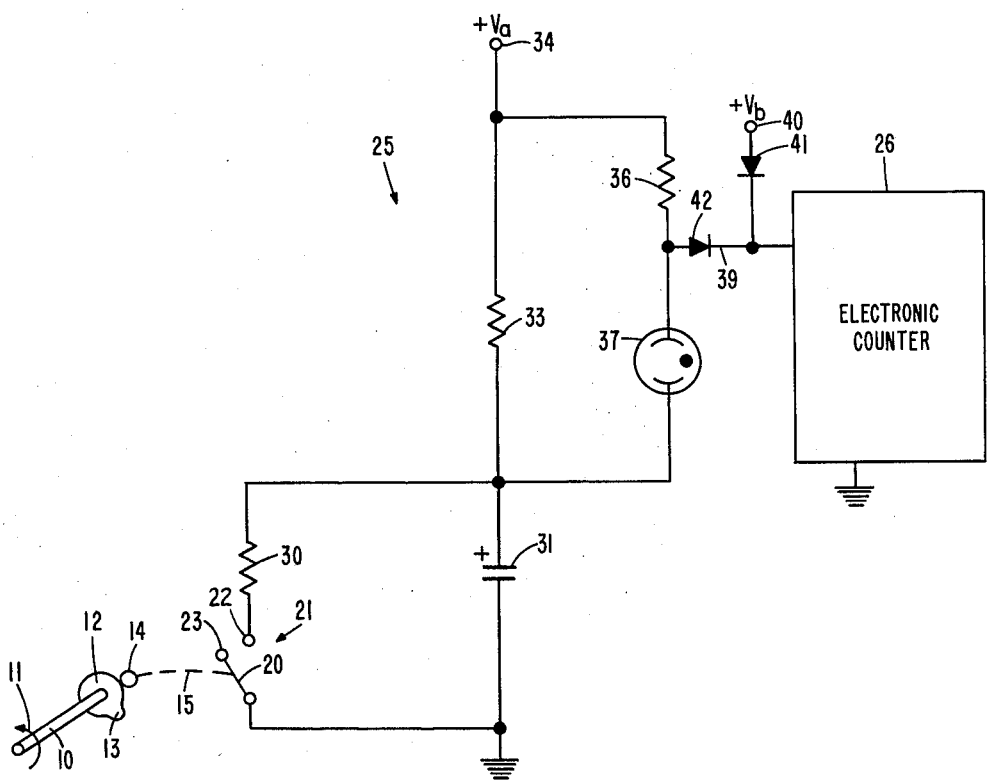

Oct. 16, 1962    G. L. BOND    3,059,146
CIRCUIT FOR ELIMINATING THE EFFECT OF CONTACT BOUNCE
Filed Feb. 27, 1961    2 Sheets-Sheet 1

INVENTOR
GEORGE L. BOND
BY Paul D. Carmichael
ATTORNEY

United States Patent Office 3,059,146
Patented Oct. 16, 1962

3,059,146
CIRCUIT FOR ELIMINATING THE EFFECT OF
CONTACT BOUNCE
George L. Bond, Owego, N.Y., assignor to International
Business Machines Corporation, New York, N.Y., a
corporation of New York
Filed Feb. 27, 1961, Ser. No. 91,904
13 Claims. (Cl. 315—171)

The present invention relates generally to the electronic arts, and more particularly to a circuit for eliminating the effect of transients generated by chattering or bouncing of mechanical contacts or the like.

As will be understood by those skilled in the art, it is often necessary to translate mechanical motion into electrical signals for use in electronic apparatus. This translation is accomplished in many instances by mechanical switches or contacts which are closed to complete an electrical circuit. For example, it may be desirable to determine the speed of a rotating shaft. A conventional system for accomplishing this result utilizes a cam rotated with the shaft which, once each revolution of the shaft, closes mechanical contacts. A first closure of the contacts actuates an electronic counter to start the timing operation and a second closure of the contacts turns the counter off whereby a reading is obtained which is indicative of the speed of the rotating shaft. The speed of the shaft is continuously monitored by subsequent closures of the contacts.

While the above system is widely employed, the transients, due to the chattering or bouncing of the mechanical contacts, may cause unreliable operation and inaccurate results. The contacts, although properly designed and fabricated, are part of a mechanical system containing first order or spring constants. When large forces and accelerations are encountered, as during high speed operations, these spring constants cause oscillations or bouncing of the contacts as the same are opened or closed. When the contacts are closed each of these oscillations may appear as an actual closure of the contacts to the electrical circuit and the electronic apparatus. The electrical circuit produces outputs which energize the electronic apparatus in a manner to indicate that the contacts have been opened and closed a number of times—as is the actual case—rather than that a single change in the physical condition and the quantity to be measured has taken place.

The above problem has long been recognized in the art and various means have been proposed for eliminating the effect of contact bounce or chatter. For example, resistor-capacitor integrating networks operating in conjunction with relays or electronic discharge devices, bistable devices such as flip-flops and the like have been used. However, the prior art apparatus is characterized by its inability to either completely eliminate the effect of contact bounce in the outputs thereof or its complexity and generally unreliable operation during periods of sustained and continuous usage. Also, when used in connection with a pulse responsive electronic counter in timing applications, the prior art apparatus is unable to provide a sharp step function output in accurately timed relation with respect to the closure of the contacts for actuating the counter. The reading of the counter may be inaccurate since it is possible for the electronic counter to be turned on and off at different times with respect to the closures of the contacts.

Briefly, the present invention relates to a highly improved and simplified circuit for eliminating the effect of contact chatter or bounce. The contacts and a first resistor of relatively low value are connected in series with respect to each other and in parallel relation across a capacitor. The capacitor and a second resistor of relatively high value are connected in series with a positive terminal of a source of direct current voltage. A third resistor of intermediate value and a discharge device characterized by conducting and nonconducting states are connected in parallel with the second resistor. An output conductor leads from the anode of the discharge device to the electronic apparatus. This output conductor may be clamped or referenced to a positive terminal of a voltage source which is of less value than the value of the above-mentioned source. A pulse having a sharp leading edge is provided on the output conductor each time the contacts are actuated. This pulse begins a short time interval after actuation of the contacts and extends until a predetermined time interval after the contacts have been reversely actuated. The pulses begin in accurately timed relation with respect to actuation of the contacts.

It is the primary or ultimate object of the present invention to provide a circuit for eliminating the effect of contact bounce wherein a single and discrete pulse output having a sharp leading edge is provided in response to actuation of the mechanical contacts. The pulse output is not subject to any transients caused by bouncing or chattering of the contacts. As will be hereinafter more fully apparent, the pulse begins very shortly after and in accurately timed relation with respect to actual energization of the contacts and ends after the contacts have been reversely actuated.

Another object of the invention is to provide a circuit for eliminating the effect of contact bounce which is characterized by its extreme simplicity in construction and operation. A minimum number of component parts are employed and highly reliable operation for continuous operating periods is obtained.

The foregoing and other objects, features and advantages of the invention will be apparent from the following more particular description of a preferred embodiment of the invention as illustrated in the accompanying drawings.

Figure 2:
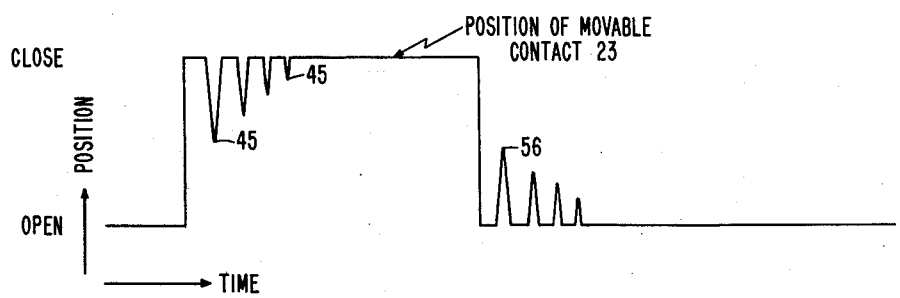
Figure 3:
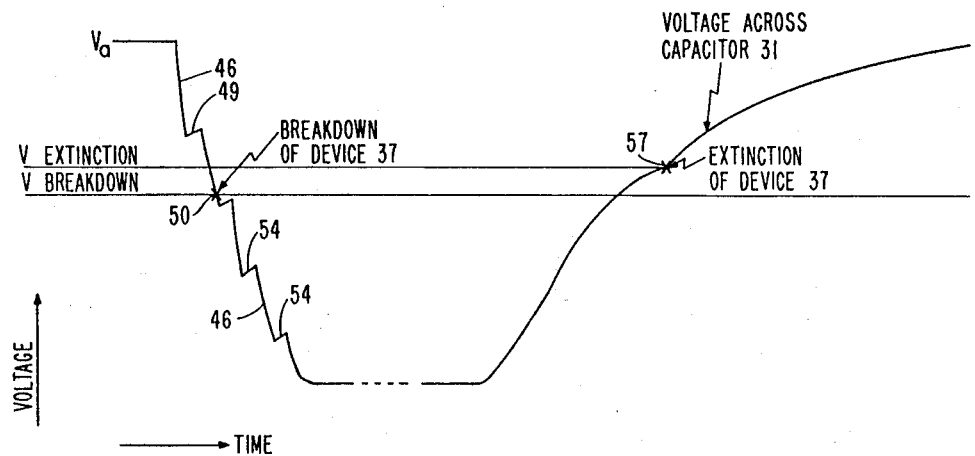
Figure 4:
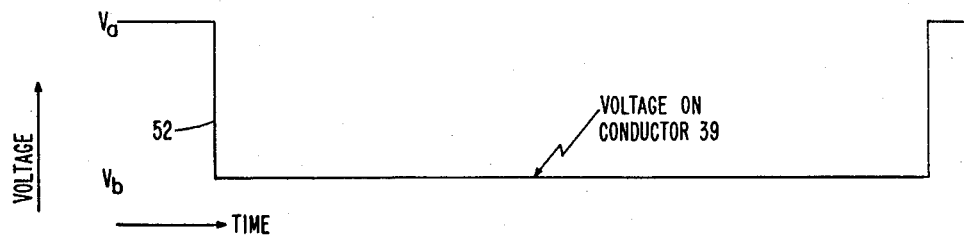

In the drawings:
FIGURE 1 is a schematic circuit diagram of apparatus for eliminating the effect of contact bounce constructed and arranged in accordance with the teachings of the present invention;
FIGURE 2 is a graph showing the position of the movable contact of the switch employed in the circuit of FIGURE 1 with respect to time; and
FIGURES 3 and 4 are graphs showing the relationship between the voltages appearing at certain points in the circuit of FIGURE 1 and time.

Referring now to the drawings, and initially to FIGURE 1 thereof, the reference numeral 10 designates a shaft which is rotating in the direction of the arrow 11. Rigidily mounted on and rotating with the shaft 10 is a cam 12 having a radial enlargement extending about one portion of its circumference which defines a camming lobe 13. Biased against the outer peripheral edge of the cam 12 is a cam follower roll 14. The cam follower roll 14 is connected by means of any suitable linkage 15 to the movable portion 20 of a switch 21. The switch 21 also has a stationary portion, not particularly shown, mounting a stationary contact 22. A movable contact 23 is carried on the movable portion 20 of the switch.

Once each revolution of the shaft 10, the lobe 13 of the cam 12 will move the cam follower roll 14 and the linkage 15 to cause closure of the switch contacts 22 and 23. Closure of the switch contacts 22 and 23 energizes an electrical circuit 25 in such a manner that a pulse output is supplied to an electronic counter 26. The counter will be turned on by the first closure of the contacts and turned off by the second closure of the contacts to provide an accurate reading of the speed of the rotating shaft 10. Subsequent contact closures will turn the counter on and off whereby the speed of the shaft is continuously monitored. Any suitable pulse responsive counter, such as that manufactured by Berkeley Division, Beckman Instruments, Inc., 2200 Wright Avenue, Richmond, California, and designated by model number 7350, may be employed.

The function of the circuit 25 is to provide the electronic counter 26 with pulses corresponding to the actuation of the switch 21. As will be later explained, these pulses are characterized by sharp leading edges, and are not affected in any manner by bouncing or chattering of the contacts 22 and 23 when the switch is closed and begin in an accurately timed manner with respect to the closure of the contacts 22 and 23.

The circuit 25 comprises a resistor 30 which is connected in series relation with the switch 21. The switch 21 and resistor 30 are disposed in parallel relation across a capacitor 31 whose lower terminal is referenced to ground. The upper terminal of the capacitor 31 is connected in series with a resistor 33 to a positive terminal 34 of a direct current voltage source $V_a$. Disposed in parallel relation across the resistor 33 are series connected resistor 36 and voltage responsive discharge device 37.

The envelope of the discharge device 37 is filled with a gas, such as neon, and this device is essentially an on-off type voltage responsive component. When sufficient voltage—the breakdown voltage—is present across the anode and cathode of the discharge device, the gas ionizes sufficiently to permit conduction and very little voltage drop takes place across the discharge device. However, when the voltage across the discharge device is below the extinction level, this device is nonconductive and appears as a high impedance circuit element. A characteristic of such gas-filled discharge devices is that the voltage necessary to cause extinction is somewhat smaller than the breakdown voltage. This is fully explained in chapter 11 of the book entitled "Theory and Applications of Electron Tubes" by Herbert J. Reich which was published in 1944 by the McGraw-Hill Book Company, Inc. of New York, New York.

An output is taken from the circuit 25 by means of a conductor 39 which extends from the anode of the discharge device 37 to the electronic counter 26. The conductor 39 is referenced to a positive terminal 40 of a direct current voltage source $V_b$ by means of diodes 41 and 42. The diodes 41 and 42 are so oriented that the voltage on conductor 39 is not allowed to fall below the value of the voltage source $V_b$ minus, of course, any voltage drop which takes place across the diode 41. When the voltage at the anode of discharge device 37 is higher than the potential at terminal 40, the diode 41 is back-biased and is nonconducting while the diode 42 is forward-biased and conducting. However, when the voltage at the anode of discharge device 37 begins to fall below the voltage at terminal 40, the diode 41 is rendered conductive and the diode 42 nonconductive whereby the conductor will be clamped to the voltage source $V_b$. Any desired means of clamping the conductor 39 to the voltage source $V_b$ can be utilized.

The value of the voltage source $V_b$ is directly related to the value of the voltage source $V_a$ and the breakdown voltage of the discharge device 37. The arrangement is such that the voltage source $V_b$ is equal to the voltage source $V_a$ minus a voltage slightly less than the breakdown voltage of the discharge device 37. In this manner the output conductor is clamped to the reference potential $V_b$ when the discharge device 37 is initially rendered conductive. The values of the resistors 30, 33 and 36 are also related in a manner which is important to the operation of the circuit 25. The value of resistor 33 is much larger than the values of either the resistors 36 or 30. Also, the resistor 36 is larger in value than the value of resistor 30.

Considering now the operation of the apparatus above described, it will be assumed that initially the switch 21 is open as shown in FIGURE 1 of the drawings. The contacts 22 and 23 are separated whereby the series circuit defined by the resistor 30 and the switch 21 is open. At this time the capacitor 31 has charged to a voltage level approaching the value of the voltage source $V_a$. The upper plate or terminal of the capacitor 31 will be at a positive level as indicated by the plus sign in the drawings. Also, a voltage level approaching the value of voltage source $V_a$ will appear on conductor 39 as shown in FIGURE 4.

During the next revolution of the rotating shaft 10 the lobe 13 of the cam 12 will engage the cam follower roll 14 and cause inward movement of the movable portion 20 of the switch. The movable contact 23 will engage the stationary contact 22. However, since the stationary contact 22 is rigidly mounted and large forces are applied to the relatively light movable portion 20 of the switch 21, the movable contact 23 will hit against the stationary contact and bounce several times before coming to rest. This is shown in FIGURE 2 of the drawings where the position of the movable contact 23 during closing and opening of the switch is depicted with respect to time. The spikes 45 indicate the oscillations or bounces of the contact 23 which occur when the movable portion 20 of the switch is moved from an open to a closed position. This chattering or bouncing results in successive opening and closing of the switch contacts 22 and 23 even though the movable portion of the switch has been moved to a closed position.

When actual physical contact is made between the movable contact 23 and the stationary contact 22, a discharge circuit is provided for the capacitor 31. This discharge circuit comprises the resistor 30 and the closed contacts of switch 21 with current flowing from the positive terminal of the capacitor to ground. The resistor 30 has a relatively low value whereby the time constant of this discharge circuit is quite small and the capacitor begins to discharge very quickly as shown at 46 in FIGURE 3 of the drawings. FIGURE 3 represents the voltage across the capacitor 31 as a function of time.

At the first bounce of the contact 23 the discharge path defined by the switch and resistor 30 will be momentarily opened. The capacitor will begin to be charged from the source $V_a$ through the resistor 33 during this time interval. The time constant of this charging circuit is quite long since the value of resistor 33 is much higher than the value of resistor 30. Consequently, the capacitor 31 will receive very little charge from the source $V_a$ during the momentary opening of the switch contacts as shown at 49 in FIGURE 3. The discharge device 37 is maintained nonconductive at this time.

As the voltage across the capacitor 31 is dissipated, an increasing voltage difference is impressed across the discharge device 37. Eventually, the capacitor 31 is discharged to point 50 where sufficient voltage difference is impressed across the discharge device 37 to exceed the breakdown voltage thereof. The discharge device is immediately rendered conductive and an appreciable change in voltage is observed on the conductor 39 leading to the electronic counter 26. The discharge device changes state very quickly to define, as shown in FIGURE 4, the sharp leading edge of a pulse 52 which is supplied to the counter 26. Since the potential at terminal 34 is slightly lower than the breakdown voltage of the discharge device 37, the conductor 39 will immediately be clamped to the potential $V_b$. The counter is turned on in response to the negative going leading edge of the pulse 52 to begin its timing function. The counter will be turned off in response to the negative going leading edge of the next pulse to provide an accurate indication of the speed of the rotating shaft.

It is quite possible that the switch contacts will still be bouncing or chattering after the discharge device 37 has been rendered conductive. The capacitor 31 will be charged from source $V_a$ through a parallel resistance network comprising the resistors 33 and 36 and the negligible internal resistance of the conducting discharge device 37 during periods when the switch contacts are momentarily separated. The resultant series resistance of this network is much smaller than the resistance value of resistor 33 but somewhat larger than the value of resistor 30. Thus, the time constant of the discharge path through the resistor 30 is smaller than the time constant of the charging circuit for the capacitor when the discharge device 37 is conducting. The capacitor 31 will be charged as shown at 54 in FIGURE 3 of the drawings during such momentary separations of the contacts when the discharge device is conducting.

One particularly important aspect of the invention makes use of the fact that the extinction voltage of the discharge device is less than the breakdown voltage thereof. The capacitor 31 must be charged to a potential higher than that necessary to cause conduction of the discharge device to render the same nonconductive as is shown in FIGURE 3 of the drawings. If the contacts are momentarily opened when or shortly after the capacitor 31 has been discharged to the point 50 and the discharge device has been rendered conductive, the capacitor will be momentarily charged from the source $V_a$ through the parallel network comprising resistors 33 and 36 and the negligible resistance of the conducting discharge device. The capacitor 31 may be charged to a voltage level above the point 50 by the momentary closure of the switch contacts. However, the discharge device 37 will remain conductive since the extinction voltage is lower than the breakdown voltage thereof. The arrangement is such that once the discharge device is rendered conductive the same will remain conductive and is not affected in any manner by subsequent chattering of the switch contacts.

Eventually, the oscillations of the switch contacts subside and the voltage on the capacitor will be completely dissipated. It is not necessary that the capacitor 31 be completely discharged during energization of the discharge device 37. The capacitor need only be discharged to a voltage level below the level corresponding to the breakdown voltage of the discharge device. The capacitor 31 and resistance 30 are of such values that the voltage on this capacitor is very quickly dissipated when the switch contacts are initially closed and the discharge device is rendered conductive very shortly after and in accurately timed relation with respect to this initial closure.

As previously mentioned, the conductor 39 is clamped to the voltage source $V_b$ by diodes 41 and 42. After the discharge device 37 is rendered conductive the diode 41 is enabled whereby the potential on conductor 39 is maintained at a constant voltage level throughout the length of the pulse 52. This voltage level is approximately equal to the voltage source $V_b$. The clamp is employed to provide an output pulse on the conductor 39 which is properly shaped and free of variations. However, depending upon the manner in which the output pulses are used, it may not be necessary to clamp the conductor 39 to a reference voltage. The pulse output would be generally rectangular but after the discharge device is rendered conductive, would vary in accordance with the change in voltage across the capacitor 31. However, a very sharp negative going leading edge on the pulse would be provided by the conduction of the discharge device.

The continued rotation of the shaft 10 causes the cam follower roll 14 to move from the lobe 13 on the cam 12 and the movable portion 20 of the switch is moved outwardly. The contacts 22 and 23 are separated whereby the discharge path defined by the resistor 30 and the switch is opened. The contact 23 may oscillate as indicated at 56 in FIGURE 2 of the drawings but these oscillations are not of sufficient magnitude to close the switch 21.

When the switch is opened, the capacitor 31 is quickly charged to a value 57 where the voltage difference across the discharge device 37 is not sufficient to sustain conduction thereof. The time constant of this charging circuit is larger than the time constant of the discharging circuit provided by resistor 30 and closed switch 21. When the capacitor is charged to the voltage level 57 the discharge device is extinguished to end the pulse 52 on the conductor 39 as is shown in FIGURE 4.

The pulse 52 begins very shortly after actuation of the switch—depending upon the time constant of the discharge path and the amount and rate of contact chatter or bounce—and ends a much longer time interval after the switch has been reversely actuated—depending upon the time constant of the parallel resistance network defined by resistors 33 and 36 and conducting discharge device 37. This pulse is not affected in any manner by contact chatter or bounce when the switch is actuated. Although in the illustrated embodiment of the invention the contacts are not shown to close due to oscillations when the switch is opened, this could occur in certain applications. However, this would not affect in any manner the shape of the pulse on the output conductors or the actuation of the electronic counter 26. The discharge device would remain conductive for a slightly longer time due to momentary discharges of the capacitor 31 when the contacts are closed.

After the discharge device 37 is extinguished, the capacitor 31 continues to be charged at a relatively slow rate through the resistor 33 of a relatively high value. Eventually the capacitor is fully charged and the circuit is conditioned for a subsequent actuation of the switch 21.

The various components of the circuit will be selected in accordance with the speed of actuation of the switch and the response of the electronic apparatus. However, the relationship between the values of the various circuit elements will be maintained to insure that the capacitor is discharged at a relatively fast rate when the switch is closed, charged at an intermediate rate when the discharge device is conducting and the switch is open and charged at a relatively slow rate when the discharge device is nonconducting and the switch is open.

It should now be apparent that the objects initially set forth have been acomplished. Of particular importance is the provision of a circuit for eliminating the effect of contact bounce wherein a device having conducting and nonconducting states and characterized by requiring a higher energy level to switch from one state to the other than is required to reversely actuate the device. This provides a significant safety factor as previously explained. Of course, devices other than neon tubes and exhibiting such characteristics can be used.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for eliminating the effect of contact bounce comprising a switch having a pair of contacts, a capacitor, a first resistor, said first resistor and said switch being connected in series relation with respect to each other across said capacitor to define a discharge circuit therefor, a source of charging potential, a second resistor, said capacitor and said second resistor being connected to said source of charging potential, a voltage responsive discharge device, said voltage responsive discharge device having conductive and nonconductive states, said discharge device appearing as a low impedance element when in its conductive state and as a high impedance element when in its nonconductive state, a third resistor, said discharge device and said third resistor being connected in series relation with respect to each other across said second resistor, said first resistor having a relatively low resistance value, said third resistor having a relatively intermediate resistance value, said second resistor having a relatively high resistance value, an output device, circuit means connecting said output device across said capacitor and said discharge device, the voltage across said capacitor controlling the state of said discharge device, and said discharge device being rendered conductive a short time interval after actuation of said switch and nonconductive a longer time interval after reverse actuation of said switch to provide an output to said output device.

2. A circuit for eliminating the effect of contact bounce comprising a switch having a pair of contacts, a capacitor, a discharge device, said capacitor being directly connected with said discharge device, said discharge device having conductive and nonconductive states, said discharge device appearing as a low impedance element when in its conductive state and as a high impedance element when in its nonconductive state, the voltage across said capacitor controlling the state of discharge device, a charging circuit for said capacitor, a discharging circuit for said capacitor, said discharging circuit comprising said switch and current limiting means, output means connected with said discharge device, and said discharge device changing states in response to the voltage across said capacitor independently of the bouncing of said contacts when said switch is actuated.

3. Apparatus according to claim 2 further characterized in that said charging circuit comprises said discharge device when said discharge device is in its conductive state.

4. Apparatus according to claim 2 further characterized in that said charging circuit has a relatively long time constant, and said discharging circuit having a relatively short time constant whereby said discharge device is rendered conductive a short time interval after actuation of said switch and is rendered nonconductive a longer time interval after reverse actuation of said switch.

5. Apparatus according to claim 2 further characterized in that discharge device is rendered conductive in response to a first voltage level, said discharge device being rendered nonconductive in response to a second voltage level, and said first voltage level being higher than said second voltage level.

6. Apparatus according to claim 5 further characterized in that said output means comprises a conductor, a source of reference potential, and means to clamp said conductor to said source of reference potential when said discharge device is conducting.

7. A bistable circuit comprising switch means, an energy storage device, a discharge device directly connected with said energy storage device, said discharge device having conductive and nonconductive states, said discharge device appearing as a low impedance element when in its conductive state and as a high impedance element when in its nonconductive state, the energy stored in said energy storage device controlling the state of said discharge device, a charging circuit for said energy storage device, a discharging circuit for said energy storage device, said discharging circuit comprising said switch means, output means connected with said discharge device, said discharge device changing to its conductive state at a first energy level, and said discharge device changing to its nonconductive state at a second energy level.

8. Apparatus according to claim 7 further characterized by output means connected with said discharge device, said output means comprising a conductor, a source of reference potential, and means to clamp said conductor to said source of reference potential when said discharge device is in its conducting state.

9. A bistable circuit comprising switch means, an energy storage device, a circuit impedance element directly connected with said energy storage device, said circuit impedance element having a pair of operating states, said circuit impedance element appearing as a low impedance element when in one of said states and as a high impedance element when in the other of said states, the energy stored in said energy storage device controlling the state of said circuit impedance element, a charging circuit for said energy storage device, a discharging circuit for said energy storage device, said discharging circuit comprising said switch means, output means connected with said circuit impedance element, said circuit impedance element changing to one of its operating states at a first energy level, and said circuit impedance element changing to the other of its operating states at a second energy level.

10. A bistable circuit comprising switch means, an energy storage device, a circuit impedance element directly connected with said energy storage device, said circuit impedance element having a pair of stable operating states, said circuit impedance element appearing as a low impedance in one of said states and a high impedance in the other of said states, the energy stored in said energy storage device controlling the state of said circuit impedance element, a charging circuit for said energy storage device, a discharging circuit for said energy storage device, said discharging circuit comprising said switch means and current limiting means, and the energy stored in said energy storage device being dissipated through said discharging circuit after actuation of said switch means to cause said circuit impedance element to change states at a preselected time interval after said actuation of said switch means.

11. A circuit for controlling an electronic device in response to the actuations of a switch means wherein said electronic device is responsive to a sharp change in the level of a signal supplied thereto comprising an energy storage device, a circuit impedance element directly connected with said energy storage device, said circuit impedance element having a pair of stable operating states, said circuit impedance element appearing as a low impedance in one of said states and a high impedance in the other of said states, circuit means interconnecting said counter and said circuit impedance element, the energy stored in said energy storage device controlling the state of said circuit impedance element, a charging circuit for said energy storage device, a discharging circuit for said energy storage device, said discharging circuit comprising said switch means and current limiting means, the energy stored in said energy storage device being dissipated through said discharging circuit upon actuation of said switch means, the dissipation of said energy from said energy storage device taking place at a controlled rate whereby said circuit impedance element is caused to change states a predetermined time interval after actuation of said switch means, and a change of state of said circuit impedance element causing a sharp change in the level of the signal supplied to said electronic device to actuate the same.

12. Apparatus according to claim 11 further characterized by said circuit means comprising a conductor, a source of reference potential, and means to clamp said conductor to said source of reference potential when said circuit impedance element is in one of said states.

13. Apparatus according to claim 11 further characterized by said charging circuit comprising said circuit impedance element when said circuit impedance element is in one of said states.

References Cited in the file of this patent
UNITED STATES PATENTS
2,877,387    Loudon et al.  ---------- Mar. 10, 1959